United States Patent [19]

Brugger

[11] 4,312,440
[45] Jan. 26, 1982

[54] BRICK SETTING APPARATUS

[75] Inventor: Karl Brugger, Dietenheim, Fed. Rep. of Germany

[73] Assignee: Lingl Corporation, Paris, Tenn.

[21] Appl. No.: 58,441

[22] Filed: Jul. 18, 1979

[30] Foreign Application Priority Data

Jul. 18, 1978 [DE] Fed. Rep. of Germany ....... 2831485

[51] Int. Cl.³ .............................................. B65G 47/29
[52] U.S. Cl. ........................................ 198/458; 414/60
[58] Field of Search .................... 414/60, 61, 114, 330; 198/456, 458

[56] References Cited

U.S. PATENT DOCUMENTS

| 839,587 | 12/1906 | Herrmann | 414/60 |
| 3,393,811 | 7/1968 | Dankelmeier et al. | 414/114 |
| 3,529,331 | 9/1970 | Putin | 198/456 X |
| 3,621,973 | 11/1971 | Carlson et al. | 198/456 |
| 3,887,060 | 6/1975 | Kamphues | 414/60 X |
| 4,083,275 | 4/1978 | Lingl | 198/458 X |

FOREIGN PATENT DOCUMENTS 1452621 8/1966 France.
16690 6/1966 Netherlands.
1015971 1/1966 United Kingdom.

Primary Examiner—Charles A. Marmor
Attorney, Agent, or Firm—Cushman, Darby & Cushman

[57] ABSTRACT

Apparatus and method for spacing apart individual articles within row(s) of articles. Spacing is achieved by causing relative vertical movement between two lifting tables situated end to end with a roller table with lifting strips designed to move within the openings defined between the spaced apart rollers in the roller table. Following such relative vertical movement the tables are moved apart horizontally from each other a predetermined distance in a first spacing step to provide spacing as required. After subsequent relative vertical movement to return the articles to the roller table the tables are further moved apart so that, on the next cycle of relative vertical and horizontal movement the tables will contact and move apart only those articles which require moving to form the further required spaces. In this manner articles in a row are sequentially spaced apart starting at the interior of the row and working outwardly towards the end thereof. This invention is particularly applicable to the spacing apart of brick mouldings.

9 Claims, 4 Drawing Figures

BRICK SETTING APPARATUS

BACKGROUND OF THE INVENTION

This invention relates to an apparatus suitable for use in, and to a method of, spacing apart articles, such as brick mouldings, or a row or rows of other brick like articles.

German Patent Specification No. 2,312,946 discloses an apparatus for forming set layers of brick mouldings from rows of brick mouldings which have been pushed onto a support in the form of an initial setting layer comprised of closed transverse and longitudinal rows. The layer is initially raised slightly off the support by a carrying element and moved in the direction of the longitudinal rows until an abutment situated in the path of that movement, contacts the tranverse row which is at the front of the layer, as considered in the direction of movement, and causes at least the rearmost transverse row to be pushed off the opposite side of the carrying element back onto the support. Thereafter, the abutment is moved out of the movement path and the remainder of the layer on the carrying element continues along the movement path until the next predetermined distance between the rearmost transverse row on the carrying element and the transverse row, previously redeposited on the support has been reached. At this point the abutment is again brought into the path of movement to again cause at least the rearmost transverse row on the carrying element to be pushed back onto the support. This process is repeated until all the transverse rows have been pushed back onto the support thereby producing a set layer of brick mouldings with predetermined intervals now formed between the discrete transverse rows or groups thereof.

One disadvantage of this apparatus is that the pushing of the mouldings back onto the support can damage the undersides of sensitive mouldings, especially green or freshly extruded wet mouldings or bricks. Another disadvantage is that because the mouldings are pressed against one another by the abutment the mouldings, particularly wet mouldings, can stick to one another. The apparatus can, therefore, become non-functioning or can provide very inaccurate depositing of mouldings back onto the support.

A further disadvantage is that because the mouldings are pushed over the ends of the carrying element there is a tendency, particularly in the case of thin mouldings, for the mouldings to topple.

Attention is also directed to a copending U.S. patent application Ser. No. 972,718, filed on Dec. 26, 1978, which discloses apparatus for forming a set layer of green bricks which are spaced apart. The apparatus includes, inpart, a roller table that employs driver rollers and two adjacently disposed conveyors each with a narrow belt which can move in the space between two adjacent rollers so that each half of the closed row of bricks can be supported by each conveyor and can be readily lifted off the roller table. After lifting, the conveyors can be moved in opposite directions toward the outside of the table while at the same time be driven in a programmed manner at the same speed in a direction opposite to their outward movement. The conveyor belts are driven so that they unroll from under bricks thereby transferring the bricks back onto the roller table. The drive of each conveyor belt is interrupted in a programmed manner so that as each conveyor is moved outwardly from an initial center position the intermittent driving of the conveyor belts redeposits bricks on the roller table with predetermined spaces therebetween.

A disadvantage of this apparatus is that, as a result of the reversing radius of the narrow belts, narrow brick mouldings cannot be readily transferred by the conveyors to the rollers since narrow brick mouldings tend to topple over the reversing radius. Furthermore, the drive between the narrow belts and the conveyors must be synchronized to move each half of the row in unison and each starting up of the belts is accompanied by a slight starting loss.

Reference is also made to German Patent Specification No. 2,447,341, which also relates to the formation of set layers. Prior to the formation of a compact layer bricks in each longitudinal row are formed into rows each having a specific number of bricks by removing some bricks from the longitudinal row. The predetermined number corresponds to the number of bricks which are to appear in the rows of the reformed set layer. The removed bricks are collected and stored until their number corresponds to the set layers and they are then supplied to the grouping device to form set layers. This device is extremely complex and is quite difficult to adjust and service.

SUMMARY OF THE PRESENT INVENTION

A first aspect of this invention relates to apparatus suitable for use in spacing apart individual articles arranged in rows, such as brick mouldings, or entire row(s) of articles. The apparatus includes first table means for supporting a row or rows of articles, and second table means comprising at least a pair of tables situated in an end to end relationship for together supporting the articles in the row(s). The first and second table means are movable one with respect to the other both vertically and horizontally and they are positioned with respect to each other so that during any such relative lifting or lowering movement therebetween the articles in the row(s) can be transferred from the first table means to the second table means or vice versa. Also included are lifting means for effecting such relative lifting and lowering movement as well as means for moving the pair tables in the second table means away from each other longitudinally along the row(s) to space apart the articles within the row(s).

A second aspect of this invention is the method of spacing apart articles, such as brick mouldings, which have been formed into row(s). The method comprises the steps of sequentially supporting the row(s) of articles to be spaced apart, using at least one pair of tables situated in an end to end relationship, followed by the moving apart of the tables longitudinally along the row(s) to sequentially space apart articles each row starting at the interior thereof and working towards the outer ends. The tables support only those articles, starting from each end of each row, which require moving to form the required spacing. After each sequential moving apart of the pair of tables, the articles are transferred to the first table means by lifting and/or lowering the pair tables relative to the first table means so that the first table means then supports each row. While each row is supported by the first table means further horizontal movement of the pair of tables in an outward manner away from each other arranges the tables relative to the articles in the row(s) so that, on subsequent transfer, by further relative movement, of the articles back onto the pair of tables, only those articles, starting from each end of each row, which require moving to form the required spacing will be lifted by the pair of tables and the process will be repeated until proper spacing throughout the row(s) is achieved.

This invention further relates to a setting layer formed by spacing apart a plurality of rows of articles, such as brick mouldings, using the apparatus and/or the method of this invention.

The preferred embodiment of an apparatus made according to of this invention provides for the programmed spacing apart of individual or groups of articles initially formed in closed rows into a spaced apart configuration. The brick mouldings or blanks are fully supported, even during transfer, and this apparatus can be simply controlled. This invention also obviates the above identified disadvantages of the prior art and, because there is no need to push the articles during spacing, the bottom edges of surfaces of the articles are not damaged due to rubbing. Also, there is no need to press against any of the surfaces of the articles, such as wet mouldings, and accordingly the surfaces will not stick together.

Thus a primary advantage of the preferred embodiment of this invention is that at any time during and after transfer, the articles remain fully supported so that even narrow articles can be readily transferred without their tipping over. Further because the spacing process does not require the articles to slide on or along any support nor any pressing of one against another the articles will not be deformed. Accordingly, it is possible for wet and sensitive articles to be spaced apart with the present invention.

Another advantage of the preferred embodiment of apparatus made in accordance with this invention is that is can be simply and easily controlled.

Advantageously, the first table means, which can be a lifting table is a roller table comprised of a plurality of spaced apart rollers, which can be driven. The second table means is preferably comprised of pairs of tables in the form of movable strips, which, during the relative lifting and lowering, move within and between the spaces defined by the spaced apart rollers.

In one embodiment, the pairs of tables are lifted to transfer the articles thereto from the first table means and the pairs of tables are lowered to transfer the articles therefrom to the first table means. Alternately, the first table means can be raised and lowered to effect transfer of the articles.

DESCRIPTION OF THE DRAWINGS

For a better understanding of this invention and to show how the same may be put into effect, reference will now be made, by way of example, to the following detailed description and the accompanying drawings in which.

DETAILED DESCRIPTION OF THE PREFERRED EMBODIMENT OF THE PRESENT INVENTION

Figure 1:
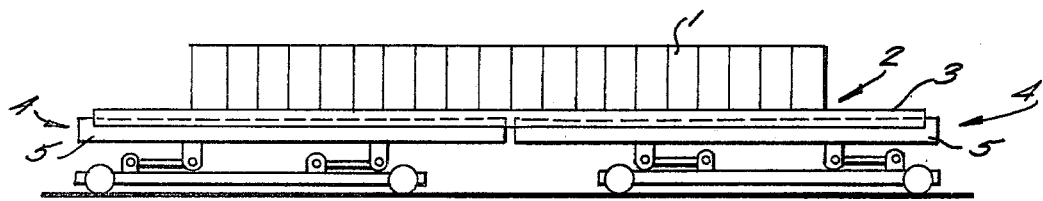
FIG. 1 diagrammatically shows a side view of an embodiment of apparatus made in accordance with this invention showing a closed row of brick mouldings in the starting position on a roller table.

Referring to the drawing, there is shown in FIG. 1 the preferred exemplary embodiment of the present invention which includes a roller table, generally indicated at 2, having a plurality of spaced apart rollers 3 drivingly supported thereon. Two lifting tables generally indicated at 4, are situated in an end to end relationship and are arranged parallel with each. Lifting tables 4 include lifting platforms or strips 5 which can move, on lifting and lowering of the lifting tables 4, within the spaces between spaced apart rollers 3. The lifting tables 4 are mounted in sliding frames 6 so they can be raised and lowered in a programmed manner. Furthermore, lifting tables 4 can be moved horizontally away from each other in a programmed manner and longitudinally along strips 5 by movement of sliding frames 6 which are mounted on rollers. The raising, lowering and horizontal movement of tables 4 are all accomplished by conventional devices such as hydraulic cylinders or greased driver and, accordingly, further description is not deemed essential for a complete understanding by one skilled in this art.

Figure 2:
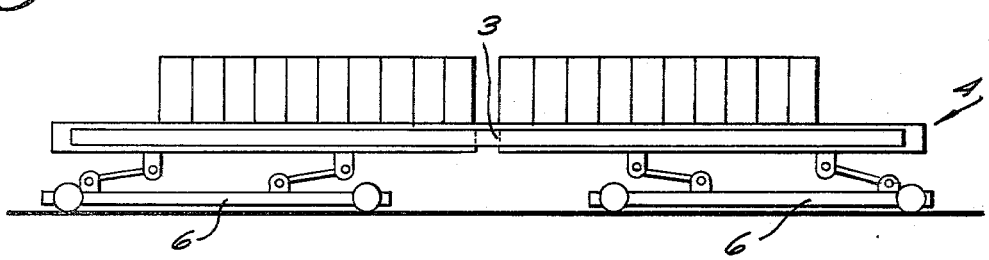
FIG. 2 diagrammatically shows a side view of the FIG. 1 apparatus where the row of brick mouldings have been lifted off the roller table by lifting tables and after a first step of spacing apart the mouldings.
Figure 3:
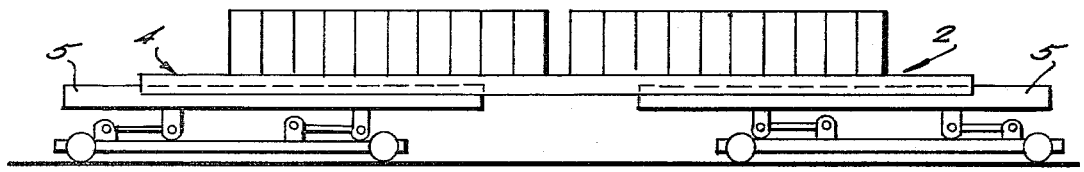
FIG. 3 diagrammatically shows a side view of the FIG. 1 apparatus where the row of mouldings has been returned to the roller table after the first step and the lifting tables are in position for a second step of the spacing process.
Figure 4:
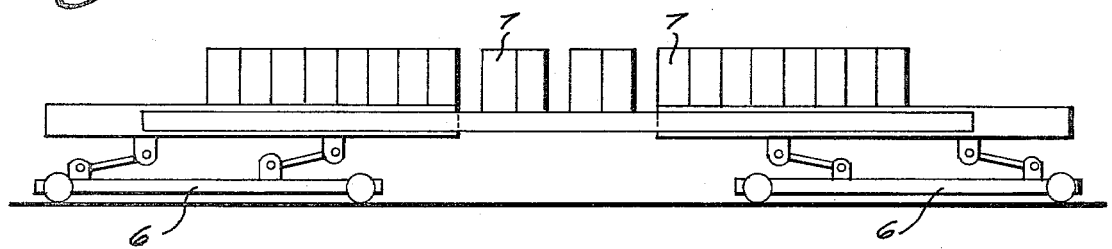
FIG. 4 diagrammatically shows a side view of the FIG. 1 apparatus after completion of the second step.

In use, and as shown in FIG. 1, closed rows 1 of brick mouldings 7, only one row of which is shown in FIG. 1, are prepared on roller table 2. Thereafter, as shown in FIG. 2, lifting tables 4 are raised to lift the closed rows 1 off roller table 2 and, in a first spacing step, lifting tables 4 are moved away from each other in opposite directions and longitudinally of the rows of brick mouldings so as to produce a programmed distance or spacing between the two central mouldings within each row. If desired, lifting tables 4 can simultaneously lift the rows 1 from the roller table 2 and move apart. After this initial raising of lifting tables 4 and this first spacing step lifting tables 4 are lowered as shown in FIG. 3 to return the rows 1 back onto roller table 2. Lifting tables 4 are then moved further apart until each reaches a predetermined position where the next space is to be formed. As shown in FIG. 4, lifting tables 4 are then raised again but now only lift those articles that require moving to form the required or predetermined spacing. Thereafter they can be moved further apart in a second spacing step to form the next spaces required between those mouldings remaining on the roller table 2 and the mouldings at the end of each of the roller tables 4.

As is apparent, by continuing the above mentioned procedure, mouldings in each row can be spaced apart sequentially starting at the center of each row and working outwardly towards the ends thereof. Mouldings can be spaced apart individually or groups of mouldings, such as pairs of mouldings as shown in the Figures, can be spaced apart in any desired or predetermined pattern.

The use of belt conveyors in place of strips has been considered. For example, narrow belt conveyors situated end to end could be moved away from each other while at the same time the belts of the belt conveyors are driven at a speed equal to that of the speed of moving apart but in an opposite direction. However, it is considered that as a result of the reversing radius of the narrow belts narrow articles could not readily be transferred because the narrow articles would tend to topple over the reversing radius. Furthermore, the drive between the driven belts and the belt conveyors could be difficult to synchronise since each starting up of the belts would include a slight starting loss.

While the invention has been described in connection with what is presently concerned to be the most practical and preferred embodiment, it is to be understood that the invention is not to be limited to the disclosed embodiment but on the contrary, is intended to cover various modification and equivalent arrangements included within the spirit and scope of the appended claims, which scope is to be accorded the broadest interpretation of such claims so as to encompass all such equivalent structures.

What is claimed is:

1. Apparatus suitable for use in sequentially spacing apart articles, such as brick mouldings, when in a row comprising first table means for supporting the articles, second table means comprising at least a pair of tables having substantially horizontal support surfaces terminating with sharply defined interior ends, said pair of tables being situated in an end to end relationship for together supporting at least a row of articles following relative vertical movement between said first and second table means, said first and second table means being positioned with respect to each other such that on relative lifting or lowering movement between said first and second table means articles can be transferred from one of said table means to the other, means for effecting said relative lifting and lowering movement each time articles are spaced apart and means for moving said pair of tables away from each other so that such movement produces the desired spacing between the articles.

2. Apparatus according to claim 1, wherein said first table means is a roller table including spaced apart rollers and said second table means comprises at least a pair of tables, each table positioned oppositely from one another, each table in said pair including strips movable within spaces defined between said spaced apart rollers, said strips having the substantially horizontal support surfaces.

3. A method for spacing apart articles, such as brick mouldings, using first and second segmented tables that can move one relative to the other with one including at least one pair of tables situated in end to end relationship, and at least a row of articles to be spaced apart, the process comprising the steps effecting relative movement between the first and second tables so that the articles are supported on the pair of tables, moving the pair of tables apart longitudinally along the row a predetermined distance, transferring the articles from the pair of tables to the first table by effecting relative movement between the first and second tables so that the first table then supports the row, and further moving apart the pair of tables while coninuing to support the row by the first table, subsequently effecting relative movement between the first and second tables thereby redepositing onto the pair of tables only those articles, starting from each outer end of the row, which require moving to form the required spacing so that by continuing this sequence of steps the articles in the row starting from the interior and working outwardly toward the ends thereof are sequentially separated.

4. A method according to claim 3, wherein the first table is a roller table including spaced apart rollers and the pairs of tables are in the form of strips movable, during the relative movement within the spaces defined between the spaced apart rollers.

5. A method according to claim 3 or 4, wherein the pair of tables are lifted and lowered to effect transfer of the articles.

6. A method according to claim 3 or 4, wherein the first table is lifted and lowered to effect transfer of the articles.

7. A method according to claim 3, wherein the articles are brick mouldings.

8. A method according to claim 7, wherein there are a plurality of rows and each of the plurality of rows are spaced apart as desired to form a setting layer for firing.

9. Apparatus for sequentially spacing apart a plurality of articles arranged in a closed row comprising first support means for supporting the row of articles in a horizontal condition, second support means for intermittently supporting a predetermined number of articles in a row while maintaining their horizontal condition, said first and second support means being movable one with respect to the other, said second support means including first and second portions arranged in an end to end relationship and being movably mounted to said apparatus so that each portion can be moved toward and away from the other in a horizontal plane, first drive means for causing relative vertical movement between said first and second support means for each separating sequence and second drive means for moving said second support means in order together to effect movement of said first and second portions and the desired spacing.

* * * * *